3,271,924
METHOD OF INSULATING CRYOGENIC SUBSTANCES
Walter Patrick Gramm, Wilmette, and William R. Howell, McHenry, Ill., assignors to Great Lakes Carbon Corporation, New York, N.Y., a corporation of Delaware
Filed Sept. 3, 1963, Ser. No. 305,981
6 Claims. (Cl. 53—29)

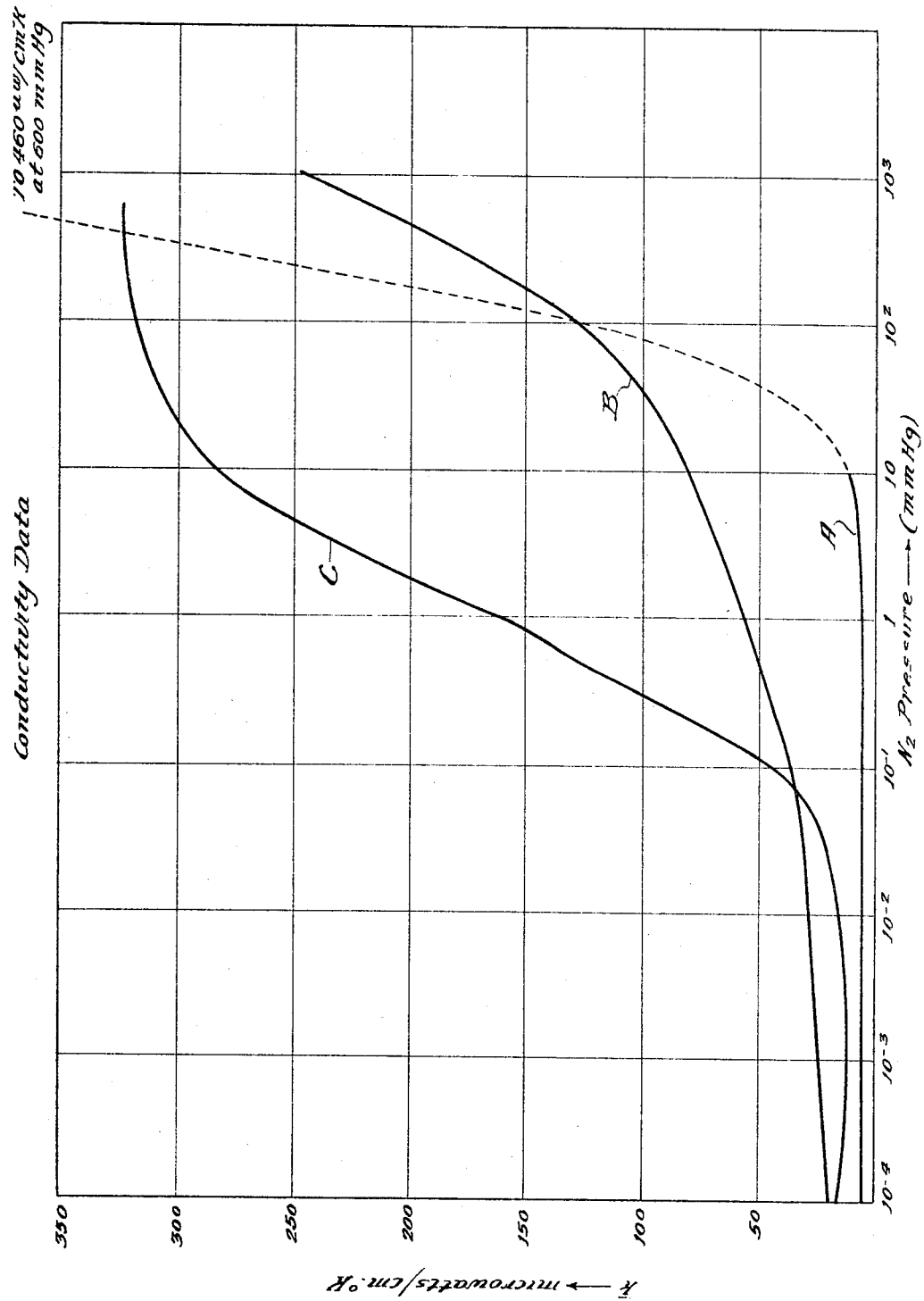

This invention relates to a method of insulating containers for low boiling substances, such as liquified gases, by use of a novel carbon insulating material employed in a powder-vacuum insulating system. More specifically the invention relates to the method of retarding evaporation of liquified gases such as liquid air, liquid oxygen, liquid nitrogen, etc., in a two walled vessel or container, having a novel carbonaceous insulating material disposed between the walls.

Cryogenics, or low temperature physics, is a field which has become increasingly important in recent years due to technological developments in such fields as missile research, preservation of foods, magnetism, and hydrocarbon processing. For instance in the missile field, liquid oxygen is commonly used as the oxidizing agent in missile propellants. In the food industry, intensive studies are being conducted on methods of preserving food at very low temperatures for prolonged periods of time. In fields of metallurgy and nuclear applications, much time is being devoted to the study of magnetism and its effects at temperatures approaching absolute zero. Studies are being made on ferrous and non-ferrous metals and alloys, and many other materials, at extremely low temperatures in order to determine their physical properties, operability, electronic arrangements and molecular structures. In the hydrocarbon industry, gases such as acetylene and ethylene are often stored as liquids at low temperatures. Polymerization, crystallization and other reactions and processes utilizing these and other organic chemicals are continually being investigated at very low temperatures, and some are already being used on a commercial basis. Operation at these low temperatures is nearly always carried out utilizing low boiling point liquified gases as a cooling medium.

Through advanced technology and development, it has become possible to liquify nearly all of the common gases which occur naturally in our atmosphere. Through a series of step-wise compression, cooling, and expansion operations, oxygen, nitrogen, hydrogen, helium and air can all be liquified. Exemplary of their boiling points are: liquid oxygen, $-183°$ C. ($90°$ K.); liquid nitrogen, $-195.8°$ C. ($77.2°$ K.); and liquid helium, $-268.9°$ C. ($4.1°$ K.). It is evident that with such long boiling points, these liquids when explosed to atmospheric conditions boil off very rapidly and vigorously. Therefore in order to preserve them as a liquid it is necessary that this exposure be minimized by storing them in suitably insulated containers. Inasmuch as it is necessary to store these liquids for periods of several weeks and even longer and to transport them from the points of production to places where they are to be utilized, much attention has been devoted to methods of improving the insulating qualities of the storage facilities and transportation vessels utilized to handle them.

One of the most common and efficient types of storage vessel is that known as a powder-in-vacuum type container. Such a container generally consists of two concentric vessels, with an air space or annulus between the two vessels. The liquid air, oxygen, etc. is stored within the inner vessel of container. The space between the two vessels serves to insulate the inner vessel from the atmosphere, and in order to improve the insulating efficiency of the space, it is usually evacuated of air so as to reduce heat conduction from the outer vessel to the inner vessel. In order to further minimize heat transfer, it is customary to fill this annular space with some kind of an insulating material which has properties of low heat conductivity. The powdery or particulate fillers which have heretofore been suggested for use in such systems have various shortcomings which reduce their effectiveness as an insulating material. For instance, they may consist of a mixture of two or more different materials each having specific heat transfer properties which are desirably imparted to the overall mixture. Because of the necessity of mixing these materials together into a homogeneous blend, the expense and trouble involved in their use is excessive. Other materials are unsuitable for applications such as storage of liquid oxygen or air, because of the possibility of an explosion or ignition, should the inner vessel ever spring a leak, and the liquid come in contact with the material. Still other fillers, because of their high density and poor packing properties are somewhat ineffective for the intended purpose, unless used in an annular space larger enough to make the overall size of the containing system prohibitive. Another factor which limits the use of some fillers is their high cost.

One of the objects of our invention is to improve the efficiency of present insulating systems such as the powder-vacuum system.

It is another object of this invention to attain a high thermal efficiency in a powder-vacuum insulating system by the use of a specially prepared carbonaceous filler.

Yet another object of the invention is the use as a filler for cryogenic insulation of an inexpensive expanded carbonaceous material prepared by specially treating a bituminous material at high temperatures.

These and other objects will become apparent in light of the foregoing description and FIGURE 1 which is a chart giving curves comparing the thermal conductivities of perlite and silica gel with those of our novel insulating material at different pressures.

These objects are accomplished by confining a low boiling liquid such as oxygen or nitrogen within an inner vessel, surrounding the inner vessel with another vessel spaced apart from the first, and filling the space between the two vessels with an essentially non-activated, expanded carbonaceous material. This carbonaceous material is produced from finely divided bituminous particles normally solid at ordinary temperatures, and capable of expanding when heated to plasticity, by a process which comprises partially devolatilizing the particles by flash calcining them in a gaseous atmosphere containing a controlled amount of oxygen, separating the solid calcined particles from the gaseous and vaporous products at a temperature at which substantially all of the vaporous products remain in the vaporous state, and collecting the resulting solid product. As an optional step, the particles can be reheated after separation to further reduce their volatile content.

The term "flash calcination" as used herein and in the appended claims may be defined as a method whereby finely divided particles of a suitable bituminous material are subjected to a very rapid upheat rate, estimated to be in excess of $600°$ C. (particle surface temperature) per second, in a reactor maintained at a temperature of between about $625°$ and about $1100°$ C., sufficient to ignite the particles. This rapid upheat of the particles is carried out in the presence of air or other oxygen containing gas, the oxygen being present in an amount such that at least 10% of the evolved combustible volatile matter remains unburned. It has been found that the use of between about 2.0 and about 4.0 standard cubic feet of oxygen per pound of bituminous material is sufficient to make the process self sustaining, permitting expansion of the individual bituminous particles at a very rapid rate while at the same time keeping the burning of the particles to a minimum.

Control of the temperature of heat treatment in the flash calcining step is accomplished by regulation of the air used in the entraining gas, thus controlling the amount of oxygen available for ignition. As stated above, the preferred amount of oxygen is between about 2.0 and about 4.0 standard cubic feet per pound of bituminous material being processed. Smaller amounts of oxygen can be used if the feed and/or the air or oxygen supply is preheated. In any event the oxygen should be present only in such an amount that at least 10% of the combustible volatiles evolved from the material during calcination are left unburned. By thus limiting the burning of these evolved combustible volatile components, the temperature of the reaction can be maintained sufficiently low (1100° C. or lower) to avoid shrinkage or collapse of the expanded bituminous particles, accompanied by an undesirable increase in density. Conversely, an insufficient supply of oxygen or fuel will cause the flash calcining to be carried out at a temperature below 625° C., producing a dense, incompletely expanded product.

Broadly, this invention relates to a method of retarding the evaporation of low boiling liquids during storage and shipment comprising confining said liquids within an inner vessel, surrounding the vessel with another vessel spaced apart from the first vessel, filling the space between the two vessels with an essentially nonactivated expanded carbonaceous material and evacuating substantially all of the air from between the walls.

This expanded material is produced from particles of a finely divided bituminous material having a volatile matter content of between about 14% and about 45% in a process which involves heating the bituminous material to plasticity by flash calcining at a temperature of between about 625° and about 1100° C. The flash calcining is carried out while the particles are entrained in a gaseous atmosphere containing oxygen in an amount such that at least 10% of the volatiles that are evolved from the particles remain unburned. The resulting expanded particles having a density of between about 5 and about 25 pounds per foot$^3$ and a volatile matter content of between about 3 and about 17%, are separated from the gaseous and vaporous products, including the evolved volatile components, at a temperature not less than that at which substantially all of said vaporous products remain uncondensed. This exact temperature is dependent upon the type of feed being used, the desired density of the final product, etc. and is intended to be high enough to minimize condensation of the vapors on the collected particles.

The solid expanded particles, may be collected and used as such as the novel insulating material of our invention. However, because the particles contain a certain amount of residual volatile matter, a subsequent heat treatment may optionally be used, said treatment consisting of heating the particles in contact with inert or oxidizing gases at a temperature sufficiently high to reduce the volatile content of the material to between about 1 and about 10%, said temperature being between about 650° C. and about 1250° C. The loose bulk density of the reheated material is between about 8 and about 20 pounds per foot$^3$.

The raw material employed in the production of the expanded carbonaceous material employed as the cryogenic insulating material in this invention may be any finely divided bituminous material which is normally solid at ordinary temperatures and is capable of expanding to plasticity upon heating. By "capable of expanding" is meant the ability of the material to soften when heated through the plastic state and swell or bloat if the volatile matter of each particle is driven off at sufficiently high rates. Examples of such materials include low, medium and high volatile bituminous coal, raw coal tar pitch coke, and raw petroleum coke. In any event the processing history of the raw material selected must not include any heating at a temperature high enough to result in a permanently set carbonaceous structure. Any such raw material subjected to said temperature will not expand satisfactorily upon heating to plasticity under the conditions disclosed herein, and thus will not result in a lightweight expanded carbonaceous material useful in the teaching of our invention.

The starting material is prepared for expansion by grinding or milling to produce finely divided particles, substantially all of which are −10 mesh, and at least 20% of which are −100 mesh. Preferably, the particle size of the feed is such that at least 60% of it is −100 mesh and at least 40% is −325 mesh. There are many methods and types of apparatus which can be employed to reduce the particle size of the feed, and it is not intended that the grinding or milling form any part of the claimed invention.

In the heating and expansion process, substantially all of the moisture contained in the bituminous feed is vaporized and removed with the vaporous and gaseous products. Inasmuch as additional heat is needed for the vaporization, it is preferable to keep the moisture content of the feed as low as possible, desirably under 5%. Excessive moisture may cause the reaction temperature to drop below the preferred lower limit of 625° C., thus resulting in an inefficiently or incompletely expanded product, or alternatively may greatly increase the fuel requirements to maintain an adequate reaction temperature.

The volatile content of the coal and the carbonaceous insulating product, exclusive of water, is determined by a procedure which is a modification of ASTM procedure No. D. 271–48. According to this modification, a small sample of the coal or the expanded product is heated to 950° C. for 5 to 10 minutes, the difference in weight of the sample before and after heating being defined as volatile content.

In a preferred embodiment of our invention, finely divided bituminous coal having a volatile content of between about 15% and about 23%, and a particle size such that at least 95% is −100 mesh and more than 50% is −325 mesh, is flash calcined by entraining in an air stream and feeding it into the top of vertical reactor. Secondary air is supplied to the reactor if needed to give a total oxygen content of between about 2.0 and about 4.0 standard cubic feet per pound of coal feed, and to produce a reactor temperature between about 700° C. and about 900° C. The resultant expanded solid product, having a loose bulk density of between about 8 and about 15 pounds per foot$^3$, more typically between about 10 and 13 pounds per foot$^3$ and a volatile content of between about 8 and about 15%, preferably between 10 and 12%, is then separated from the gaseous products in a cyclone collector operated at a temperature not less than that at which substantially all of the vaporous and gaseous products remain in the vaporous state.

The resultant expanded material, having a particle size such that less than 60% is +100 mesh, and preferably having a size distribution such that less than 40% is +150 mesh, 40 to 50% is −200 mesh and 10 to 25% is −325 mesh, can be used without further modification as the insulating material for low temperature applications. Alternatively it can be reheated to a temperature of between about 900° C. and about 1100° C. and contacted with additional air or gases to drive off some of the residual volatile matter. This further devolatilization will result in the production of a material having a density of between about 10 and about 15 pounds per foot$^3$, preferably between about 11.5 and about 13.5 pounds per foot$^3$, a volatile content of between about 1 and about 5%, and a particle size distribution such that between 25 and 35% is +150 mesh and at least 35% is −325 mesh.

One apparatus in which this lightweight insulating product can be used is similar to that described in U.S. Patent 2,396,459, by L. I. Dana, and entitled "Insulated Container for Liquified Gases and the Like," and in U.S. 2,967,152, by L. C. Matsch et al., and entitled "Thermal Insulation." This apparatus consists of a double walled insulating container having spaced parallel walls defining an insulating space therebetween for the reception of a solid powder type insulation material, of the type described in our invention. Suitable structural bracing or framework maintains the spaced relationship of the two vessels. Means are provided for filling the inner vessel with a low boiling liquified material such as liquid oxygen, liquid nitrogen, etc. and for venting the same during filling. A valved connection is attached to the outer vessel and communicates with the space between the two vessels for purposes of evacuating the same, such connection being attached to a suitable vacuum pump or other vacuum producing or maintaining means. One or more manholes or suitable valved filling means are provided in connection with the outer vessel for the purpose of filling the annular space between the two vessels with a suitable insulating material. Care must be exercised during filling to avoid uneven packing of the material and the formation of voids or pockets within the space. When the space has become completely filled, the manhole covers are replaced, and hermetically sealed, after which the air is evacuated. If valved filling means are used in place of covers, a partial vacuum may be pulled on the annular space prior to filling, with evacuation being completed after filling. The filling and evacuation of the annular space can be carried out prior to, during, or after the introduction of the low boiling liquid into the inner vessel. It is preferable, however, that the annular space be filled, and the vacuum pulled prior to the introduction of the liquid, thus taking advantage of the cooling effect of the liquid to further increase the vacuum in the space.

Our invention is not limited to the insulation of containers of any particular size or shape, but may be utilized with spherical, cylindrical or irregularly shaped containers having capacities ranging from a few liters to thousands of gallons. Furthermore, additional insulating or cooling means can be used in conjunction with our material. For instance, the cold vessel can be surrounded with two concentric insulation spaces, one being filled with our material while the other one is maintained as a vacuum, or is filled with an inexpensive liquid or gas maintained at relatively low temperatures. Likewise, refrigeration can be utilized to keep the outer surface of the container cool. These methods serve to reduce the temperature gradient through the insulation, resulting in improved performance.

The choice of materials for construction of the two vessels is immaterial to the teachings of this invention. However, it should be noted that these materials should be adapted to the type and size of container under consideration, the amount of vacuum desired between the walls of the two vessels, the type and corrosiveness of the liquid to be contained within the inner vessel, the pressure if any which will be applied to the liquid within this vessel, and the thermal properties of the metal. Thus the outer vessel may be made of a material such as stainless steel, while the inner is made from brass or bronze which generally has favorable shock and impact resistances at relatively low temperatures. Generally, at cryogenic temperatures, stainless steel has a lower thermal conductivity value than metals such as copper, brass, aluminum, monel and inconel, and is thus to be preferred.

The theory of heat transfer is based upon the realization that there are three main types of transfer of heat from one source to another, these being known as convection, conduction, and radiation. Convection consists of the transfer of heat by the random movement of gases. As applied to an insulating vessel, containing two concentric walls such as that described in the aforementioned patents by Dana et al. and Matsch, it is seen that heat is transferred by convection from the outer vessel to the inner vessel by the movement or flow of gases or air in the space between the two walls. In order to minimize this random movement of gases, it is thus necessary to reduce the amount of gas or air present in this space, and to use a filler in the space thus impeding the amount of air movement which can occur. Conduction, which is the transfer of heat from one molecule to another or one body to another in contact with it can be of two types, gas conduction and conduction through solids. It is obvious that the amount of conduction in a gaseous medium is dependent upon the number of molecules present therein. Therefore if a high vacuum is maintained in a given space, the number of gas molecules present is greatly reduced, and gas conduction is thus minimized. In the case of solids, the amount of conduction is dependent upon the solids themselves, and upon their contact with one another, the amount of conduction being dependent upon the type and density of the solids and the area of the particle surfaces in contact with one another; the greater the surface contact and/or density, the greater the conduction. Therefore it is desirable to use solids which pack in a random manner and in which the individual particles of the solid are in point to point contact with one another. In this manner the heat is conducted from the particles only at their contact points, and when these are kept at a minimum, conduction is substantially reduced.

Although evacuation of a given air space will reduce the amount of heat transfer by convection and by conduction, it does not affect heat transfer by radiation which is a form of wave energy independent of the molecules present. Thus even though a high vacuum is maintained in the space between the two concentric vessels, radiation will still occur between the inner wall of the outer vessel and the outer wall of the inner vessel. One way of reducing the effects of radiation is by polishing these walls which face one another to make them highly reflective. Another method of reducing the effects of radiation is by interposing reflecting and/or absorbing surfaces between these two walls. Thus the introduction of a filling material with these surfaces between the two vessels helps to substantially reduce radiation.

The use of the lightweight carbonaceous material produced according to the process hereinbefore described, as an insulating filler between the walls of a vessel for holding low boiling liquified gases has many advantages over fillers which have previously been used for this purpose. The fine particle size of the material (less than 60% +100 mesh), affords an optimum effective spacing between the walls of the containers. This substantially minimizes the random molecular movement of gases which remain within the confines of the filler space, thus reducing heat transfer by convection and by gaseous conduction. In addition, the relatively high porosity, and opacity offers a maximum interference to continuous heat flow by solid conduction, convection and radiation. Inasmuch as thermal conduction is regarded as being a function of apparent or bulk density of packing materials, and proportional to that density, the lightweight property of this carbonaceous product renders it even more ideally suitable as an insulating filler. Furthermore, heat transfer by solid conduction is further minimized by the point to point contact of the irregularly shaped particles.

In FIGURE 1 are 3 curves comparing the apparent mean thermal conductivity ($\bar{k}$) as a function of interstitial gas pressure, of the lightweight carbonaceous material utilized in this invention (curve A) with two materials commonly used for cryogenic insulation, silica aerogel (curve B) and expanded perlite (curve C). The carbonaceous insulation used in the determination was prepared from a sample of Royalty coal which was flash calcined at a temperature above 625° C. and then reheated after separation from the volatile gases to reduce the volatile content to 2–3%. The density of the carbonaceous material was about 12.5 lbs. per foot³. The material was used in the annular space of a double wall cylindrical container with hemipherical end closures. After the annular space was filled with the carbonaceous material, care being taken to avoid the formation of any empty pockets, the space was pumped down to approximately 25 microns after which liquid nitrogen (boiling at 77° K.) was introduced into the inner space, the outside of the container being kept at 300° K. The cooling effect of the liquid further lowered the pressure to approximately .015 micron. The thermal conductivity was determined at this pressure after which dry nitrogen was introduced into the annular space, and conductivities were determined at pressure intervals between .015 micron and 600 mm. It can be seen from the slope of curve A that the thermal conductivity is very uniform at pressures up to about 1.0 mm. and increases slowly up to about 10 mm. above which the $k$ value increases quite rapidly because of gaseous conduction and convection. In comparison it is seen in curve B that the sample of chemically prepared silica aerogel (250 A.) exhibits a smoother curve with less slope, but up to a pressure of about 50 mm., its $k$ value is considerably higher than our carbonaceous material. An examination of curve C shows that the thermal conductivity of expanded perlite (−30 +80 mesh) is higher than that of our material at very low pressures, and starts climbing rapidly at a much lower pressure (between about .01 and .001 mm.) than our carbonaceou material (about 10 mm.).

This expanded carbonaceous material is easily distinguishable over other carbonaceous materials such as carbon black, graphite and conventional coal char, which are sometimes employed as insulating materials in low temperature applications. Carbon black is generally produced by the contact of a flame upon a metallic or other depositing surface, or by heating carbonaceous vapors or gases to a decomposition temperature in a suitable chamber of furnace. The material is characterized by spherical unexpanded particles of extremely small size having a high specific gravity of 1.80 and a bulk density as high as 110 pounds per cubic foot. When used as an insulating filler, its bulk density adversely affects its thermal conductivity properties.

Graphite is a black lustrous mineral having a hexagonal crystalline striated shape. It is characterized by a high specific gravity of the particles ranging from between about 2.1 to about 2.3. Because of its structure, the material exhibits anisotropic properties of heat transfer, and has a relatively high conductivity. When loosely packed, the particles have a tendency toward lamellar orientation if vibrated or jostled. This results in unequal heat transfer in different directions.

For insulating purposes, coal char has the disadvantage that it has a high ash content and is somewhat lumpy. If it is comminuted to eliminate the lumps, the bulk density of the material increases appreciably.

Differentiated from these materials is the expanded lightweight structure of the carbonaceous particles used in the teaching of our invention which are characterized by a multitude of open and closed pores within the particles. These pores serve to increase the insulating effect of the individual particles. Under the microscope, these particles have a bubble-like surface structure which we think is advantageous in serving to reduce or minimize radiation effects between the walls of the two containers when this material is interposed between the walls. The particles are finely divided, amorphous, isotropic and generally have an ash content of less than 10%. The specific gravity is also considerably lower than that of carbon black and graphite.

The lightweight carbonaceous material which is used as the insulating material of this invention may be used to insulate a wide variety of liquified gases, including oxygen, nitrogen, helium, hydrogen and liquid air as well as liquified hydrocarbons. In addition it should be noted that this material may be used in other low temperature applications such as in refrigeration equipment, and in protecting commodities and supplies which must be kept at low temperatures, and in many other applications.

An additional advantage will be noted when liquid oxygen, liquid air, and other liquified gases which are capable of sustaining or aiding oxidation or combustion are insulated using the carbonaceous material as prepared according to the hereinbefore mentioned process. There is always a possibility that the inner vessel of the container may rupture or be broken in some way or may spring minute leaks in which case the liquified gas within the container will leak out and come in contact with the insulating material thus creating an explosive condition which could be very serious. However it is shown in U.S. 2,872,305, by F. L. Shea, Jr., entitled "Liquid Oxygen Explosive and Method for Preparing Same" that a lightweight carbonaceous material of this type when mixed with liquid oxygen forms a mixture which is very difficult to detonate under impact and is completely safe and harmless under ordinary conditions. In that respect this carbonaceous material can be differentiated from materials such as lamp-black and char which when mixed with liquid oxygen form a composition which can be readily detonated, sometimes accidentally and unexpectedly.

The following example is given as illustrative of our invention, but its presentation is not to be construed as any way limiting the scope of the invention as delineated in the claims.

*Example I*

Red Indian bituminous coal having a volatile content of 23%, and 3% ash was milled to 45.4% −325 mesh and was fed into the top of a vertical reactor maintained at a temperature of 870° C. The coal was fed to the reactor at a rate of 25.3 lbs. per minute and was contacted with 433 s.c.f./minute of air. The particles were rapidly expanded while entrained in the air, and were removed from the reactor and separated from the air and combustion products in a cyclone separator operated at a temperautre of about 435° C. The expanded product had a loose bulk density of 10.2 pounds per foot³ a volatile content of 11.1%, and substantially no moisture. The yield was 68%. The particle size distribution was 40% +150 mesh, 45% −200 mesh and 24% −325 mesh. This lightweight carbonaceous material was used as a filler in a double wall container containing liquid nitrogen which boils at −195.8° C. The annular space between the two walls of the container was evacuated to less than $10^{-4}$ torr after which the thermal transmission from wall to wall within the container through the carbonaceous material was measured. The apparent mean thermal conductivity ($\bar{k}$) was calculated to be $6\mu$ watts/cm. 1-1° K. between 76° K. and 300° K.

Although this invention contemplates the utilization of the lightweight expanded carbonaceous material produced as hereinbefore mentioned as the sole filler between the walls of a two vessel container insulating system, it does not preclude the possibility of mixing small quantities of other kinds of powders in with the carbonaceous material. Thus other low heat conductive powders or particles such as finely divided silica, silicates such as expanded perlite, various oxides, etc. may be incorporated, in an amount up to 10%, into the material in order to augment or assist the expanded carbonaceous material in retarding the conduction of heat between the walls. Likewise additional or supplemental radiant heat barrier materials such as copper coated mica flakes or aluminum flakes, etc. may be used in small amounts. Furthermore, amounts up to about 1% of "getters"—substances such as activated charcoal, silica gel and molecular sieves which have the ability to absorb residual gases at cryogenic temperatures—may be added to help maintain the vacuum for long periods of time. Alternatively, a small amount of our novel material can be activated with e.g. steam and used as a "getter" in the system. It should be noted however that when containers such as railroad cars are insulated with a mixture of the preferred carbonaceous material and another material, the movement and shaking of the container may cause the mixtures to segregate. Therefore it is preferable to use the carbonaceous material as the sole filler.

The moisture content of the expanded carbonaceous material as it is produced is generally below 1%, and usually below .1% inasmuch as substantially all of the moisture is driven off during the calcining. It has been found that if an insulating material contains an appreciable amount of moisture, difficulty will be encountered in pumping down the annular space in which the material is placed. Therefore, this material is preferably stored until use in moisture resistant containers (such as polyethylene bags) to preclude any appreciable pickup of moisture. With a moisture content of less than .1%, the lightweight carbonaceous material used in this invention exhibits very good pump-down characteristics.

Depending upon the properties of the lightweight carbonaceous material to be used, and the physical characteristics of the low-temperature liquid, the container and the surroundings, it may be found that the optimum insulating effect is accomplished by utilizing the material having a relatively narrow range of particle sizes. Accordingly, light grinding or milling (so as not to increase the density of the material), screening or other means of classification are contemplated as means for obtaining the particle size distribution best suited for the particular application. This segregation of particles according to size can be carried out at any step in the process after the initial expansion and prior to the introduction of the material into the annular space of the container.

It is preferable in carrying out the teachings of this invention that the space between the two walls of the vessel in which the carbonaceous insulating filler is used be evacuated of air. Since it is impossible to remove all of the air, a certain amount will remain. It is contemplated that before drawing a vacuum in this space, the air may be replaced by some other gas preferably of the inert variety such as argon. Thereafter, when the vacuum is pulled, the minute traces of gas remaining in the passageways between the particles in this space will be composed of this particular gas.

The distance between the walls of the container, and the amount of lightweight carbonaceous insulating material which must be used in connection with the insulation of low boiling liquids are determined on the basis of operative conditions. Such factors as the amount of liquid to be contained, the length of time for which the liquid is to be stored, the type of liquid and the temperatures prevailing outside of the container are all factors which must be considered in determining the thickness of this annular space. With these factors in mind, and with use of appropriate thermal conductivity values for the expanded carbonaceous material, the amount of insulation can be readily ascertained.

Experience in operation will indicate that there are many modifications and variations which can be made in utilizing the novel concept of this invention, without departing from the spirit or scope of the appended claims.

We claim:

1. The method of insulating a powder-vacuum container designed for storing liquified gases at cryogenic temperatures comprising:

preparing an essentially non-activated expanded carbon having a loose bulk density of between about 10 and about 13 lbs. per foot³, a particle size such that less than about 40% of the particles are above +150 mesh, between about 40 and about 50% are −200 mesh, and between about 10% and about 25% are −325 mesh, from a finely divided bituminous coal 95% of which passes a 100 mesh screen and at least 50% of which passes a 325 mesh screen and containing between about 15% and about 23% by weight of volatile matter by flash calcining, at a temperature of between about 700° C. and about 900° C., the coal entrained in a gaseous atmosphere containing oxygen in an amount such that at least 10% of the evolved combustible volatile matter remains unburned, and separating the solid partially calcined particles from the gaseous and vaporous products at a temperature at which substantially all of the vaporous products remain in the vaporous state; and utilizing this carbon having a volatile matter content of between about 10 and about 13% as a filler in the outer evacuatable chamber of a powder-vacuum insulating system.

2. The method of retarding the evaporation of a low boiling liquid during storage at cryogenic temperatures comprising:

retaining the liquid in a vessel defining a confined space;

surrounding this space with a second confined space;

filling the annulus between the vessels with an essentially non-activated expanded carbonaceous material having a loose bulk density of between about 5 and about 25 lbs. per foot³ and produced from finely divided bituminous particles normally solid at ambient temperatures and capable of expanding when heated to plasticity, by (a) flash calcining the particles at a temperature of between about 625° C. and about 1100° C. while entrained in a gaseous atmosphere containing oxygen in an amount such that at least 10% of the evolved volatile matter remains unburned, (b) separating the solid particles from the gaseous and vaporous products at a temperature at which substantially all of the vaporous products remain in the vaporous state, and (c) collecting the resulting solid product; and removing substantially all of the air from the second confined space.

3. A method for storing low boiling liquids and retarding their evaporation for sustained periods comprising:

providing a confined inner storage space for the liquid and a confined annular space surrounding said storage space;

filling this annular space with a material comprising an essentially non-activated expanded carbonaceous material having a loose bulk density of between about 10 and about 13 lbs. per foot³, a volatile content of between about 10 and about 13% and a particle size such that less than about 40% is +150 mesh, about 40 to about 50% is −200 mesh, and about 10 to about 25% is −325 mesh produced from finely divided bituminous coal having a volatile content of between about 15% and about 23% and a particle size such that at least about 95% is −100 mesh and at least about 50% is −325 mesh by flash calcining the coal at a temperature of between about 700° C. and about 900° C. while entrained in a gaseous atmosphere containing between about 2.0 and about 4.0 standard cubic feet of oxygen per pound of feed, separating the solid partially calcined particles from the gaseous and vaporous products at a temperature at which substantially all of these vaporous products remain in the vaporous state, and collecting the particles;

removing substantially all of the gas from the annular space; and introducing the low boiling liquid into the inner storage space.

4. The method of providing a thermal insulation for low boiling liquids at cryogenic temperatures comprising using in conjunction with a powder-vacuum insulating system, an essentially non-activated, expanded carbonaceous material having a loose bulk density of between about 10 and about 15 lbs. per foot$^3$ and prepared from finely divided bituminous coal by (a) flash calcining the coal entrained in a gaseous atmosphere containing oxygen in an amount such that at least 10% of the evolved combustible volatile matter remains unburned, (b) separating the solid calcined particles from the gaseous and vaporous products at a temperature at which substantially all of the vaporous products remain in the vaporous state, and (c) heating the particles to reduce their volatile content to less than 5% by weight.

5. A method according to claim 4 wherein the bituminous coal has a volatile content of between about 15% and about 23% by weight.

6. In an insulated container for the storage of low boiling liquids at cryogenic temperatures consisting of an inner storage vessel and an outer storage vessel spaced apart from said inner vessel to provide an annular space between said vessels, the improvement comprising filling said annular space with an essentially non-activated, expanded, carbonaceous particulate material having a loose bulk density of between about 5 and 25 lbs./cu. ft. and produced from finely divided bituminous particles normally solid at ambient temperatures and capable of expanding when heated to plasticity by (a) flash calcining the particles at a temperature of between about 625° C. and about 1100° C. while entrained in a gaseous atmosphere containing oxygen in an amount such that at least 10% of the evolved combustible matter remains unburned, (b) separating the solid particles from the gaseous and vaporous products at a temperature at which substantially all of the vaporous remain in the vapor state, and (c) collecting the resulting solid product.

References Cited by the Examiner

UNITED STATES PATENTS

| | | |
|---|---|---|
| 2,396,459 | 3/1946 | Dana _____ 62—45 |
| 2,903,409 | 9/1959 | Morse _____ 100—273 XR |
| 2,967,152 | 1/1961 | Matsch et al. _____ 62—45 XR |
| 2,999,366 | 9/1961 | La Fave et al. _____ 62—45 |
| 3,007,596 | 11/1961 | Matsch _____ 62—45 XR |
| 3,101,862 | 8/1963 | Matsch _____ 62—45 XR |
| 3,118,194 | 1/1964 | Biais _____ 62—45 XR |

TRAVIS S. McGEHEE, *Primary Examiner.*

R. A. O'LEARY, L. L. KING, *Assistant Examiners.*